United States Patent [19]

Faust et al.

[11] Patent Number: 4,565,751

[45] Date of Patent: Jan. 21, 1986

[54] CATHODE FOR HIGH CURRENT DENSITY AND HIGH POWER DENSITY ELECTROCHEMICAL CELLS

[75] Inventors: Marilyn A. Faust, Rochester; Hans W. Osterhoudt, Spencerport, both of N.Y.

[73] Assignee: Eastman Kodak Company, Rochester, N.Y.

[21] Appl. No.: 621,350

[22] Filed: Jun. 18, 1984

[51] Int. Cl.[4] .......................... H01M 6/16; H01M 4/40
[52] U.S. Cl. ...................................... 429/94; 429/197; 429/217
[58] Field of Search ................... 429/197, 217, 194, 94

[56] References Cited

U.S. PATENT DOCUMENTS

| 2,738,375 | 3/1956 | Schlotter | 429/217 |
|---|---|---|---|
| 3,700,502 | 10/1972 | Watanabe et al. | |
| 3,716,409 | 2/1973 | Cairns et al. | |
| 3,827,910 | 8/1974 | Cairns et al. | |
| 3,892,590 | 7/1975 | Gunther | 429/217 |
| 3,933,520 | 1/1976 | Gay et al. | |
| 4,086,404 | 4/1978 | Vissers et al. | |
| 4,091,176 | 5/1978 | Alfenaar | |
| 4,144,383 | 3/1979 | Joó et al. | |
| 4,215,189 | 7/1980 | Bergum et al. | 429/217 |

OTHER PUBLICATIONS

Fukuda et al., "Lithium/Poly-Carbonmonofluoride Cylindrical Type Batteries", Chapter 46, Power Sources, Academic Press 1975, pp. 713-718.

*Primary Examiner*—Donald L. Walton
*Attorney, Agent, or Firm*—John R. Everett

[57] ABSTRACT

A cathode comprising a current collector coated with a dispersion of $(CF_x)_n$ wherein x is equal to or less than 1.2 and n is an indeterminately large number, a current carrier and a binder characterized in that the current collector is a conductive foil, the binder is sufficiently adhesive to adhere the coated dispersion to the conductive foil and the coated dispersion has a porosity greater than 43 percent. The cathodes are useful in electrochemical cells having light metal anodes.

16 Claims, No Drawings

CATHODE FOR HIGH CURRENT DENSITY AND HIGH POWER DENSITY ELECTROCHEMICAL CELLS

BACKGROUND OF THE INVENTION

Field of the Invention

The present invention relates to a poly(carbon monofluoride) cathode for use in electrochemical cells, particularly as a cathode in electrochemical cells having a light metal anode.

Electrochemical cells, such as those disclosed in U.S. Pat. No. 3,700,502 and U.S. Pat. No. 3,536,532 are used in many portable devices requiring electrical power. Such devices include cameras that use motors for film advance and electronic flash units for supplemental light.

Commercial embodiments of the electrochemical cells disclosed in the aforementioned U.S. patents comprise a lithium anode and a cathode structure comprising a dispersion of poly(carbon monofluoride) hereinafter referred to as $(CF_x)_n$ wherein n is an indeterminately large number, carbon and a non-adhesive binder [poly(tetrafluoroethylene) also known as Teflon ®] molded to a titanium grid. The electrolyte is 1M $LiBF_4$ in $\gamma$-butyrolactone. These electrochemical cells usually have a limiting current density of about 50-60 milliamperes per square centimeter ($mA/cm^2$) and maximum power density of about 29-35 milliwatts per square centimeter ($mW/cm^2$). The problem associated with the latter cells is that, although they are useful in many applications, greater limiting current densities and maximum power densities are needed for certain high power applications such as more rapidly charging electronic flashes in cameras, turning motors in cameras or tape recorders, setting off emergency alarms or providing emergency lighting.

SUMMARY OF THE INVENTION

The present invention solves the foregoing problem by providing a cathode which, when used in electrochemical cells having a light metal anode, results in an unexpected increase in limiting current density and maximum power density. The cathode of this invention comprises a current collector coated with a dispersion of $(CF_x)_n$ wherein x is equal to or less than 1.2 and n is an indeterminately large number, a current carrier and a binder characterized in that the current collector is a metal foil, the binder is sufficiently adhesive to adhere the dispersion to the metal foil and the coated dispersion has a porosity greater than 43 percent preferably 57-73 percent.

The increase in limiting current density and maximum power density is surprising since it would be expected that increasing the porosity of prior art $(CF_x)_n$ cathodes only comprising a non-adhesive binder and a grid current collector would result in a loss of power and increased internal cell resistance. Thus, it is unexpected that a porous $(CF_x)_n$ cathode in combination with an adhesive binder and a foil current collector would result in the present improvement in limiting current density and maximum power density.

A preferred embodiment of the present invention comprises an electrochemical cell comprising the cathode of this invention, an electrolyte and a light metal anode. By light metals we mean alkali metals, alkaline earth metals and aluminum. Lithium is preferred.

DETAILS OF THE INVENTION

The improved $(CF_x)_n$ cathodes of this invention are prepared by forming a well mixed dispersion of $(CF_x)_n$, a current carrier and an adhesive binder in a solvent, such as a mixture of isopropyl alcohol and water. The dispersion is coated on a metal foil current collector to the desired thickness with a spatula, coating knife or other coating means. Dry thicknesses of 0.076 to 1.0 mm are preferred. Maximum porosity is achieved by drying the cathode without pressing at about 50° C. Intermediate porosity is achieved by pressing the cathode at about 23,000 psi for up to one minute at room temperature before drying. Pressed cathodes are then thoroughly dried by heating in a vacuum oven at about 65° C. until dry.

The preferred cathode-active material is $(CF_x)_n$ wherein x is equal to or less than 1.2 and n is an indeterminately large number. However, other forms of $(CF_x)_n$ having a different stoichiometric relationship are also useful. The $(CF_x)_n$ may be prepared according to procedures disclosed in U.S. Pat. No. 3,536,532 and U.S. Pat. No. 3,700,502, the disclosures of which are incorporated herein by reference. $(CF_x)_n$ is also available commercially from Allied Chemical, Air Products and Chemicals, and Ozark-Mahoning Company.

The preferred coated and dried cathode dispersion comprises from 70 to 90 weight percent $(CF_x)_n$, from 5 to 20 weight percent current carrier and from 3 to 15 weight percent adhesive binder.

The current carrier portion of the cathode dispersions may include materials such as the various forms of carbon as well as metal sulfides such as copper sulfide, chalcopyrite, pyrite and lead sulfide. The preferred current carriers are carbons.

It is important that the binder be an adhesive. Also, it is preferable that the binder have a Tg no greater than 35° C. The binder must be sufficiently adhesive to insure that the binder adheres the cathode coating to the current collector and coheres the cathode dispersion to itself without molding or pressing which would reduce porosity.

Useful adhesive binders include polymers and copolymers of poly(vinyl acetate)-based adhesives (PVAc), polyester- or polyol-based polyurethanes, styrene-butadiene copolymers and terpolymers, ethylene-propylene and ethylene-propylene-diene synthetic rubbers, polyolefins, poly(vinylidene fluoride), and polyamides. Mixtures of such binders are also useful. The preferred binders are poly(vinyl acetate)-based materials such as poly(vinyl acetate), poly(vinyl acetate-co-vinyl alcohol) and poly(ethylene-co-vinyl acetate).

Preferred adhesives, especially vinyl acetate-based polymer adhesives, can be prepared in the presence of suspending agents such as poly(vinyl alcohol) and thus, the adhesive can be a mixture of more than one polymeric species.

Conductive foils of metals such as stainless steel (SS), Al, Ti and Ni are useful current collectors. The current collector can also be a perforated metal foil. Preferred current collectors are foils of Al, Ti and stainless steel.

The cathodes of this invention are particularly useful in electrochemical cells comprising a light metal anode and an electrolyte comprising a lithium salt dissolved in an organic solvent, or mixture of organic solvents. A flat electrochemical cell design and a spiral-wound design are used in the examples to illustrate the usefulness of the cathode of the invention. However, the electrochemical cells can be in a variety of formats. Useful formats include spiral-wound construction described in "Electrochimica Acta", 21, 855 (1976); cointype construction described in "Progress in Batteries & Solar Cells", 3, 74 (1980); button-type construction described in "Batteries and Energy Systems", McGraw-Hill, p. 90, (1970); bobbin-type construction described in "Batteries and Energy Systems", McGraw-Hill, p. 35, (1970); and flat and spiral-wound cells as prepared and described in the accompanying examples.

Useful lithium salts for the electrolyte are selected from a variety of compounds including lithium hexafluoroarsenate ($LiAsF_6$), lithium perchlorate ($LiClO_4$), lithium tetrafluoroborate ($LiBF_4$), lithium hexafluorophosphate ($LiPF_6$) and lithium tetrachloroaluminate ($LiAlCl_4$). $LiClO_4$ and $LiBF_4$ are preferred.

A wide variety of electrolytes are available to choose from. Many such electrolytes are disclosed in U.S. Pat. No. 4,302,520. Preferred electrolytes include those disclosed in commonly assigned U.S. Ser. No. 621,349, in the names of Martin, Muehlbauer and Pan, filed on the same day as the present case. The electrolytes have an electrical conductance of at least $5 \times 10^{-3}$ ohm$^{-1}$cm$^{-1}$ and a contact angle with the cathode of 40° or less and comprise a lithium salt, selected from the group consisting of $LiClO_4$, $LiAsF_6$, $LiAlCl_4$ and $LiBF_4$, dissolved in a solvent blend of (a) at least 40 volume percent of an anhydrous, aprotic organic liquid having a surface tension of less than 25 dynes/cm and a molecular weight of 40–120; and (b) up to 60 volume percent of an anhydrous organic liquid having a dielectric constant of at least 25.

Exemplary electrolytes of this class include:

(a) 1 Molar lithium perchlorate dissolved in a solvent blend consisting of 60 volume percent of isopropyl acetate and 40 volume percent propylene carbonate;

(b) 1 Molar lithium perchlorate in a solvent blend of 40 volume percent propylene carbonate and 60 volume percent of methyl acetate;

(c) 1 Molar lithium perchlorate in a solvent blend consisting of 50 volume percent of propylene carbonate and 50 volume percent of dimethoxyethane;

(d) 1 Molar lithium perchlorate in a solvent blend of 20 volume percent propylene carbonate and 80 volume percent methyl acetate;

(e) 1 Molar lithium perchlorate in a solvent blend of 40 volume percent propylene carbonate and 60 volume percent methyl acetate;

(f) 1.25 Molar lithium perchlorate in a solvent blend of 20 volume percent propylene carbonate and 80 volume percent methyl acetate;

(g) 1.5 Molar lithium perchlorate in a solvent blend of 20 volume percent propylene carbonate and 80 volume percent dimethoxyethane;

(h) 1.5 Molar lithium perchlorate dissolved in a solvent blend of 40 volume percent propylene carbonate and 60 volume percent dimethoxyethane.

In preparing the flat cells, the prepared cathode is completely wrapped in a thin separator such as a non-woven, electrolyte-resistant fabric of polypropylene fibers. Other useful separators include non-woven polyethylene, woven fabrics of polypropylene and polyethylene, fiberglass fabrics and microporous films (Celgard TM sold by Celanese). The separator should be as thin as possible and have a pore construction that presents minimal possible obstruction to the diffusion of ions. The separators are not conductive to electrons. Thicknesses up to about 0.127 mm are especially useful. Separator density should be in the range of 1 to $4 \times 10^{-3}$ g/cm$^2$. Porosities or pore volume of 10 to 70% are useful.

A light metal foil, serving as the anode, is folded around the separator-wrapped cathode. The assembled anode and cathode are placed in a flat plastic pouch. The electrolyte is added and the pouch sealed. Tabs, one for each electrode, extend through the pouch for electrical connections.

The following examples are presented to show the improved current and power densities obtainable with electrochemical cells containing the electrode of the present invention.

For comparison purposes, either a commercial ⅔ A-size lithium/$(CF_x)_n$ electrochemical cell made in a spiral-wound format (Matsushita Electric Company) or a cell made similarly except in a flat configuration was used as a control. The construction and average properties of two of such flat cells are presented in Table I infra. The cathodes of Examples 1–3 were prepared as follows. Cathode dispersions were coated and optionally pressed to provide various porosities on a metal foil current collector. The current collectors also served as the support for the cathode. In the following examples a uniform dispersion consisting of a 75:10:15 weight to weight mixture of $(CF_x)_n$, carbon and adhesive binder in a mixture of isopropyl alcohol and water was prepared. The isopropyl alcohol-water mixture was 24% isopropyl alcohol on a weight basis. The cathodes were coated with coating knives having different clearances to achieve dry thicknesses from about 0.075 to 0.25 mm. When high (e.g. 73%) porosity coatings were desired, the cathode dispersion was dried on the current collector, without pressing, at about 50° C. on a coating block. The resulting layers had good dry adhesion. When intermediate (e.g. 57%) porosity was desired, the coated cathode material was pressed once on a Carver press at about 158.6 MPa. The pressed and unpressed coatings were dried thoroughly by heating in a vacuum oven at about 65° C. for 15 hours and then stored in a vacuum desiccator. The porosity of the cathode coating can be tailored to fit the electrical needs of a system. The power density can be balanced with the energy density for a particular application by regulating the cathode porosity between the extremes.

The porosity of the coated dispersions was determined according to the following formula:

$$\% \text{ Porosity} = \frac{V_T - \sum_i \frac{g_i}{\rho_i}}{V_T} \times 100$$

where $V_T$ is the total volume of the coated dispersion in cm$^3$, $g_i$ is the mass of the "i"th component of the dispersion in grams and $\rho_i$ is the density of the "i"th component in g/cm$^3$.

The cathodes prepared as above consisted of a patch (3.6 cm × 1.7 cm) of the coated dispersion on the current collector. With this cathode a lithium/$(CF_x)_n$ electrochemical cell was assembled in an atmosphere of helium. The anode, comprising an excess of lithium, and the cathode were separated by a polypropylene, non-woven fabric separator and placed in a flat Kapak® pouch (Kapak Corporation).

Each cell, including the control, was evaluated by a polarization test. During the evaluations, the solid layers (anode, cathode and separator) of the cells in the flat format were held flat and tightly together with a spring clamp.

The polarization test was automated. During this test, the cell was discharged through a series of nine resistance loads ($R_L$) ranging in order from 10,000 to 2 ohms, with 6.5 seconds at each resistance. The load voltage ($V_L$) at the end of each 6.5 second interval was recorded. Using Ohm's law, the current being drawn from the cell was computed as $$I = V_L/R_L.$$

The cell itself is considered to be a voltage source operating at $V_B$ in series with a resistance $R_B$. Thus:

$$I = \frac{V_B}{R_B + R_L} \text{ or}$$

$$\frac{1}{I} = \frac{R_B}{V_B} + \frac{R_L}{V_B}.$$

From a plot of $I^{-1}$ versus $R_L$ the parameters $V_B$ and $R_B$ can be determined from the slope and intercept. In the limit of $R_L$ vanishing, only the internal resistance $R_B$ limits the current extractable from the cell. Thus, the intercept of the $I^{-1}$ versus $R_L$ plot allows one to estimate the limiting current ($I_l$) from the cell as $$I_l = V_B/R_B.$$

The limiting current density ($i_l$) is defined as the quotient $I_l/A$ where A is the area of the cathode. The maximum power density extractable from the cell is given as $$P_{E,max} V_B i_l/4$$

where $P_{E,max}$ is in milliwatts cm$^{-2}$ when $i_l$ is in milliamps cm$^{-2}$.

EXAMPLE 1

Unpressed Cathode with Poly(vinyl acetate) Binder as SS Foil

A cathode dispersion of 14.3% solids containing poly(carbon monofluoride) (CF), carbon (C) and poly(vinyl acetate) (PVAc) [CF:C:PVAc(75:10:15)] was coated on degreased 4 mil (0.10 mm) stainless steel (SS) foil and dried without pressing. The unpressed cathode coating was dried at about 65° C. under vacuum for about 15 hours. The cathode coating had a structure with a porosity of approximately 73% based on the method of computation discussed previously. A patch (3.6 cm × 1.7 cm) of cathode coating on its SS foil support was used as the cathode. The cathode was wrapped with 1 ply of 0.127 mm thick polypropylene-based non-woven fabric separator sold by Pall Trinity Micro Corp.

Cells were assembled using the separator-wrapped cathode, lithium foil as the anode, 1M LiClO$_4$ in equal volumes of propylene carbonate (PC) and dimethoxyethane (DME) as the electrolyte and a heat-sealable plastic pouch as container. The lithium foil was folded around the separator-wrapped cathode. This assembly was placed in the plastic pouch, electrolyte was added and the pouch was sealed. Extending from inside the pouch through the seal was a tab from each of the two electrodes, and to these tabs electrical connections were made for the testing procedures described previously.

For comparison purposes, a control for Example 1, and for Examples 2-3 infra, was a flat cell made using a similar cathode structure and composition as used by Matsushita in its commercial ⅔ A-size cell. The cathode in this cell was a mixture of $(CF_x)_n$, a non-adhesive binder, poly(tetrafluoroethylene) (PTFE), and carbon on a titanium grid current collector. The other components of the control cell are the same as in the examples except as noted in Table I.

A comparison of the electrical properties of the cells of Example 1 and the control electrochemical cells is presented in Table I. The limiting current density of the cells of Example 1, utilizing foil current collectors and adhesive binders was increased by 17% over those of the control. The maximum power density ($P_{E,max}$) of the cells of Example 1 was about 26% greater than that of the control.

EXAMPLE 2

A cathode coating was prepared on 0.051 mm nickel foil from a dispersion identical to that used for the cathodes of Example 1 at a 21% solids content. The other cell components were the same as those in Example 1 except that a 3.4 mil thick separator was used. The cathode porosity was about 66%. The limiting current density was increased over the control by 131% and the maximum power density was increased over the control by 135%.

EXAMPLE 3

A cathode coating was prepared on 0.102 mm SS foil from a dispersion identical to that used for the cathode of Example 1, except at 16.8% solids. The coating was dried at about 65° C. under vacuum for about 15 hours and then stored over Drierite in a vacuum desiccator for 10 to 11 months before cathodes and cells were prepared. The porosity of the cathode was about 69%. The separators used in the cells of this example were 0.086 mm thick. The limiting current density reached the high value of 290 mA/cm$^2$ which is 152% greater than the control. The maximum power density was 152 mW/cm$^2$, a 145% increase over the control.

The average electrical properties of Examples 1-3 are shown in Table I.

TABLE I

Description and Properties of Flat Li/(CF$_x$)$_n$ Cells Containing Electrolyte of 1M LiClO$_4$ in Equal Volumes of PC and DME

|  | Control | Example 1 |
|---|---|---|
| Cathode |  |  |
| Current collector | Ti grid | 4 mil SS foil |
| Binder | Teflon ® | PVAc |
| Porosity (%) | 43 | 73 |
| Separator |  |  |
| Thickness (mm) | 0.127 mm | 0.127 mm |
| Polarization Test |  |  |
| $i_l$ (mA/cm$^2$) | 115 | 135 |
| $P_{E, max}$ calculated (mW/cm$^2$) | 62 | 78 |

|  | Example 2 | Example 3 |
|---|---|---|
| Cathode |  |  |
| Current Collector | 0.051 mm Ni foil | 0.102 mm SS foil |
| Binder | PVAc | PVAc |
| Porosity (%) | 66 | 69 |
| Separator |  |  |

TABLE I-continued

Description and Properties of Flat Li/(CF$_x$)$_n$ Cells Containing Electrolyte of 1M LiClO$_4$ in Equal Volumes of PC and DME

| Thickness (mm) | 0.086 | 0.086 |
|---|---|---|
| Polarization Test | | |
| Limiting current density i$_l$ (mA/cm$^2$) | 266 | 290 |
| Maximum power density P$_{E, max}$ predicted (mW/cm$^2$) | 146 | 152 |

EXAMPLES 4-5

Cathode Coatings in ⅔ A-size Spiral-Wound Electrochemical Cell

The control for Examples 4-5 was a ⅔ A-size Li/(CF$_x$)$_n$ cell made by Matsushita.

A cathode dispersion consisting of 75% (CF$_x$)$_n$, 10% carbon and 15% poly(vinyl acetate) (weight basis), in a water-isopropanol mixture was prepared. The dispersion was coated on each side of a degreased, 0.051 mm thick Ni foil. First one side of the foil was coated and dried and then the other side was coated and dried. Two cathodes of lateral dimensions 2.5×30 cm were cut from the coating such that a single tab of bare Ni extended from one edge of each cathode midway down its length. This tab served as the electrical connection to the positive pole of the assembled spiral-wound cell. Each cathode was wrapped in a single ply of separator and the separator-cathode combination was sealed along the tab edge of the cathode on a bar sealer. Excess separator along this edge was trimmed away. At each end of the cathode enough separator was left in place so as to prevent any direct contact between the anode and the cathode during and after winding the electrodes. Prior to making this wind, the anode current collector (Ni grid) and tab (Ni foil) were welded together and applied to the lithium foil.

Each cathode-separator-anode combination was wound into a spiral-wound configuration in a dry room maintained at a relative humidity of 1-2%. This allowed direct exposure of lithium foil to air without harmful effects to electrical performance. The winding operation was done by first placing the cathode-separator combination in a device which held the end of the cathode so that it could be rolled. Then the anode was placed on top of the separator such that both the anode tab and the cathode tab were to the right hand side and the anode end was 1.5 cm away from the end of the cathode held in the winder. Excess separator was folded back over the cathode to prevent shorting and a support arm was brought in to hold the roll as it was formed. The cathode-separator-anode package was rolled slowly, guiding the tabs around the center post as it was turned. When the end of the cathode-separator-anode combination approached the arm, excess lithium past the end of the separator was trimmed.

The rolled assembly was pushed into a ⅔ A-size can which contained a PTFE spacer to help prevent shorting against the can bottom. A plastic washer was placed in the can so that the cathode tab protruded through a center hole and the anode tab was sandwiched against the can. This washer was pushed down so as to pack the roll into the can as much as possible. The tabs were trimmed to length and the can placed in a device which made a crimp in the can just above the plastic washer to hold it in place and form a shoulder against which the cap could be placed. The anode tab was welded to the can and the cathode tab welded to the cap washer. The cell was weighed dry, filled with electrolyte and put in a vacuum desiccator to remove trapped air (which would have prevented complete wetting of the cathode if it was not removed). The cap was tapped into place in the can and the upper edge of the can crimped over to seal the cell. The cell was again weighed to determine grams of electrolyte that had been added. Tabs were welded to the can and cap, making the cell ready for polarization and discharge.

Examples 4-5 were spiral-wound cells prepared according to the just-described procedure. Example 4 used the same electrolyte as the control so that a direct comparison of the improvements resulting from the cathode of the invention could be made with the control. Example 5 included a different electrolyte to show that the cathode of this invention is operable with other electrolytes.

Both the control and the cells of Examples 4-5 were tested by the polarization test as in Examples 1-3. Then the cells were also pulse-discharged galvanostatically at a 10% duty cycle, i.e., pulsed with a constant current for 6 seconds, followed by no current for 54 seconds, to a cut-off of 1.0 V. Determined from this test were the following parameters: average load voltage ($\overline{V}_L$), coulombic yield, energy yield (in joules) and energy density yields. The results are reported in Table II.

The formula for computing coulombs extracted (C$_{ext}$) from the discharge data is $$C_{ext} = It_{co}$$

I = current, which is constant in a galvanostatic discharge;
t = time (in seconds) in which co denotes the time required to reach the cutoff voltage.

The percent coulombic yield was computed by dividing C$_{ext}$ by the coulombs stored and multiplying the quotient by 100.

The formula for computing energy yield (W$_{ext}$) is $$W_{ext} = I \int_0^{t_{co}} V_L(t) \, dt; \text{ wherein}$$

V$_L$ (t) is the load voltage at time t.
$\overline{V}_L$ is the average load voltage at the terminals of the battery from the inception of the discharge until V$_L$ = V$_{co}$ and was computed as $\overline{V}_L = W_{ext}/C_{ext}$.

The energy densities were computed by dividing W$_{ext}$ by the grams of CF present in the cathode and by dividing W$_{ext}$ by the volume of the cathode. These parameters indicate how effectively the mass and volume of the cathode were utilized.

The results of the polarization and pulse-discharge test are presented in Table II.

TABLE II

| | Control | Example 4 | Example 5 |
|---|---|---|---|
| Cathode | | | |
| Current collector | Ti grid | Ni foil | Ni foil |
| Porosity | 43% | 64% | 64% |
| Binder | PTFE | PVAc | PVAc |
| Electrolyte | 1 | 1 | 2 |
| Polarization Test | | | |
| V$_B$ (V) | 2.32 | 2.31 | 2.32 |
| i$_l$ (mA/cm$^2$) | 60.4 | 96.0 | 153 |

TABLE II-continued

|  | Control | Example 4 | Example 5 |
|---|---|---|---|
| $I_l$ (A) | 4.95 | 14.4 | 23.0 |
| $P_{E, max}$ (mW/cm$^2$) | 35.0 | 55.4 | 88.9 |
| Pulsed Discharge Test | | | |
| Discharge Current (A) | 4 | 5 | 5 |
| i (mA/cm$^2$) | 48.8 | 33.3 | 33.3 |
| cutoff voltage | 1.0 | 1.0 | 1.0 |
| $V_L$ | <1 | 1.62 | 1.78 |
| Coulombic Yield (%) | 0 | 65.7% | 73.8% |
| Energy Density | | | |
| joules/g CF | 0 | $3.30 \times 10^3$ | $4.09 \times 10^3$ |
| joules/cm$^3$ cathode | 0 | $2.09 \times 10^3$ | $2.59 \times 10^3$ |
| Total Energy Yield | | | |
| (joules) | 0 | $4.46 \times 10^3$ | $5.24 \times 10^3$ |

Electrolyte 1: 1 M LiBF$_4$ in $\gamma$-butyrolactone.
Electrolyte 2: 1 M LiClO$_4$ in 1:1 propylene carbonate and dimethoxyethane.

The limiting current densities ($i_l$) of the electrochemical cells in Examples 4-5 are 59% and 153% higher than the control. The maximum power density of Examples 4-5 are 58% and 154% higher than that of the control. Table II also shows that the control did not yield coulombs or joules when pulse-discharged (6 seconds on, 54 seconds off) at 4.0 A even when the cutoff voltage was as low as 1.0 V. On the other hand, cells made according to this invention gave superior electrical performance when discharged at 5.0 A (instead of 4.0 A in the control). The superiority, apparent from the polarization data, is further supported by the pulse-discharge data, both in the total energy yield and in the energy density parameters that denote how well fuel and space were utilized. In other words, the $\frac{2}{3}$ A-size Li/CF$_x$ electrochemical cells of this invention yielded substantial useful electrical power and energy at a current which closely approximates the short circuit current of the control.

The invention has been described in detail with particular reference to preferred embodiments thereof, but it will be understood that variations and modifications can be effected within the spirit and scope of the invention.

We claim:

1. A cathode comprising a current collector coated with a dispersion of (CF$_x$)$_n$ wherein x is equal to or less than 1.2 and n is an indeterminately large number, a current carrier and a binder characterized in that the current collector is a metal foil, the binder is sufficiently adhesive to adhere the coated dispersion to the metal foil and the coated dispersion has a porosity of 57-73 percent.

2. The cathode of claim 1 wherein the coated dispersion comprises from 70 to 90 weight percent (CF$_x$)$_n$, from 5 to 20 weight percent carbon and from 3 to 15 weight percent binder.

3. The cathode of claim 1 wherein the current collector is a metal foil selected from the group consisting of stainless steel, nickel, aluminum and titanium.

4. The cathode of claim 1 wherein the binder is selected from the group consisting of poly(vinyl acetate)-based adhesives, polyester- and polyol-based polyurethanes, styrene-butadiene copolymers and terpolymers, ethylene-propylene rubbers, polyolefins, polyamides, polyesters, poly(vinyl halides) and poly(vinylidene halides).

5. The cathode of claim 1 wherein the current carrier is carbon.

6. The cathode of claim 1 having a stainless steel foil current collector coated with a dispersion of 75 weight percent (CF$_x$)$_n$, 10 weight percent carbon and about 15 weight percent poly(vinyl acetate)-based adhesive in which the coated dispersion has a porosity of 57-73 percent.

7. The cathode of claim 1 having a nickel foil current collector coated with a dispersion of about 75 weight percent of (CF$_x$)$_n$, about 10 weight percent carbon and about 15 weight percent poly(vinyl acetate)-based adhesive in which the coated dispersion has a porosity of from 57-73 percent.

8. An electrochemical cell comprising:
   (a) a light metal anode;
   (b) an electrolyte; and
   (c) a cathode comprising a current collector coated with a dispersion of (CF$_x$)$_n$ wherein x is equal to or less than 1.2 and n is an indeterminately large number, a current carrier and a binder characterized in that the current collector is a metal foil, the binder is sufficiently adhesive to adhere the coated dispersion to the metal foil and the coated dispersion has a porosity of 57-73 percent.

9. The electrochemical cell of claim 1 comprising a lithium anode.

10. The electrochemical cell of claim 1 wherein the electrolyte comprises a lithium salt, selected from the group consisting of LiClO$_4$ and LiBF$_4$, dissolved in a solvent blend of
   (a) at least 40 volume percent of an anhydrous, aprotic organic liquid having a surface tension of less than 25 dynes/cm and a molecular weight of 40-120; and
   (b) up to 60 volume percent of an anhydrous organic liquid having a dielectric constant of at least 25.

11. The electrochemical cell of claim 8 or 9 wherein the coated cathode dispersion comprises from about 75 to 95 weight percent (CF$_x$)$_n$, from about 5 to 10 weight percent carbon and from 3 to 15 weight percent of an adhesive binder.

12. The electrochemical cell of claim 8 or 9 in a spiral-wound format.

13. The electrochemical cell of claim 8 or 9 wherein the current collector is a metal foil selected from the group consisting of stainless steel, nickel, aluminum and titanium.

14. The electrochemical cell of claim 8 or 9 wherein the electrolyte is 1M LiBF$_4$ in $\gamma$-butyrolactone.

15. The electrochemial cell of claim 8 wherein the electrolyte comprises LiClO$_4$ dissolved in a 1:1 mixture of propylene carbonate and dimethoxyethane.

16. The electrochemical cell of claim 8 wherein
   (a) the electrolyte comprises LiClO$_4$ dissolved in a 1:1 mixture of propylene carbonate and dimethoxyethane; and
   (b) the cathode has a nickel foil current collector coated with a dispersion of about 75 weight percent (CF$_x$)$_x$, about 10 weight percent carbon and about 15 weight percent poly(vinyl acetate)-based adhesive.

* * * * *